US009890641B2

(12) United States Patent
Potter et al.

(10) Patent No.: US 9,890,641 B2
(45) Date of Patent: Feb. 13, 2018

(54) GAS TURBINE ENGINE TRUNCATED AIRFOIL FILLET

(71) Applicant: United Technologies Corporation, Hartford, CT (US)

(72) Inventors: Christopher L. Potter, East Hampton, CT (US); Michael Espinoza, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 458 days.

(21) Appl. No.: 14/597,633

(22) Filed: Jan. 15, 2015

(65) Prior Publication Data

US 2016/0208614 A1 Jul. 21, 2016

(51) Int. Cl.
*F02C 7/12* (2006.01)
*F01D 5/14* (2006.01)
*F04D 29/32* (2006.01)
*F01D 9/02* (2006.01)
*F01D 5/02* (2006.01)
(Continued)

(52) U.S. Cl.
CPC ............... *F01D 5/141* (2013.01); *F01D 5/02* (2013.01); *F01D 5/34* (2013.01); *F01D 9/02* (2013.01); *F02C 3/06* (2013.01); *F04D 29/324* (2013.01); *F05D 2220/32* (2013.01); *F05D 2230/53* (2013.01); *F05D 2240/12* (2013.01); *F05D 2240/303* (2013.01); *F05D 2240/304* (2013.01); *F05D 2250/71* (2013.01); *F05D 2260/941* (2013.01); *Y02T 50/671* (2013.01); *Y02T 50/673* (2013.01)

(58) Field of Classification Search
USPC ......... 60/330, 331, 354, 363, 364, 736, 744, 60/745, 806; 415/97, 98, 99, 105, 106, 415/115, 198.1, 199.1, 199.2, 199.3, 415/199.4, 199.6, 211.1, 228
See application file for complete search history.

(56) References Cited

U.S. PATENT DOCUMENTS

| 4,310,286 A | 1/1982 | Peters et al. |
| 6,511,294 B1 | 1/2003 | Mielke et al. |
| 6,524,070 B1 | 2/2003 | Carter |

(Continued)

FOREIGN PATENT DOCUMENTS

| EP | 1087100 | 3/2001 |
| JP | 2011127441 | 6/2011 |

OTHER PUBLICATIONS

The Search Report and Written Opinion for Singapore Application No. 102015092731, dated May 6, 2016.

(Continued)

*Primary Examiner* — Binh Q Tran
(74) *Attorney, Agent, or Firm* — Carlson, Gaskey & Olds, P.C.

(57) ABSTRACT

An integrally bladed rotor includes a rim integral with a web that extends radially inward to a bore. The rim provides an end wall from which integral blades extend radially outward to a tip. The blades have an airfoil that extends in a chord-wise direction from a leading edge to a trailing edge. A fillet circumscribes the airfoil and joins the airfoil to the end wall. The fillet is at one of the leading edge and the trailing edge is truncated at least 50% in an axial direction to provide a face of the rim.

19 Claims, 3 Drawing Sheets

(51) Int. Cl.
    *F02C 3/06*    (2006.01)
    *F01D 5/34*    (2006.01)

(56) References Cited

U.S. PATENT DOCUMENTS

| | | | |
|---|---|---|---|
| 7,220,103 B2 | 5/2007 | Cunha et al. | |
| 8,100,655 B2 | 1/2012 | Stone et al. | |
| 8,591,195 B2* | 11/2013 | Di Florio | F01D 5/16 416/224 |
| 8,631,577 B2 | 1/2014 | Ing | |
| 2005/0232774 A1 | 10/2005 | Suciu et al. | |
| 2006/0140768 A1* | 6/2006 | Tam | F01D 5/143 416/193 A |
| 2007/0177979 A1 | 8/2007 | Hoeger | |
| 2011/0044818 A1* | 2/2011 | Kuhne | F01D 5/143 416/212 A |
| 2011/0064580 A1* | 3/2011 | Barnes | F01D 5/143 416/204 A |
| 2013/0108445 A1 | 5/2013 | Suciu et al. | |
| 2013/0259645 A1* | 10/2013 | Bergholz, Jr. | F01D 5/18 415/115 |
| 2015/0107265 A1* | 4/2015 | Smith | F01D 5/143 60/805 |

OTHER PUBLICATIONS

Extended European Search Report for European Application No. 16151321.3 dated Jun. 22, 2016.

\* cited by examiner

GAS TURBINE ENGINE TRUNCATED AIRFOIL FILLET

BACKGROUND

This disclosure relates to an airfoil for a gas turbine engine. In one example, the disclosure relates to a fillet of an integrally bladed rotor airfoil.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Rotating stages in the compressor and turbine sections include multiple rotor disks. One type of rotor disk used in the high pressure compressor includes integrally bladed rotors. Circumferentially arranged airfoils are integral with and extend radially outward from a rim of the rotor disk. A fillet circumscribes the entire airfoil to join the airfoil structurally and aerodynamically with an end wall provided by the rim, which provides an inner flow path through the stage.

SUMMARY

In one exemplary embodiment, an integrally bladed rotor includes a rim integral with a web that extends radially inward to a bore. The rim provides an end wall from which integral blades extend radially outward to a tip. The blades have an airfoil that extends in a chord-wise direction from a leading edge to a trailing edge. A fillet circumscribes the airfoil and joins the airfoil to the end wall. The fillet is at one of the leading edge and the trailing edge is truncated at least 50% in an axial direction to provide a face of the rim.

In a further embodiment of the above, the trailing edge is truncated at least 65% in the axial direction.

In a further embodiment of any of the above, the trailing edge is truncated at least 80% in the axial direction.

In a further embodiment of any of the above, the trailing edge is truncated at least 90% in the axial direction.

In a further embodiment of any of the above, an aft side of the web includes an annular groove configured to receive a hub.

In another exemplary embodiment, a gas turbine engine compressor section includes a stack of rotor disks. One of the rotor disks includes a rim that supports a blade. The blade includes an end wall and has an airfoil that extends in a chord-wise direction from a leading edge to a trailing edge. A fillet circumscribes the airfoil and joins the airfoil to the end wall. The fillet at one of the leading edge and the trailing edge truncated at least 50% in an axial direction to provide a face of the rim.

In a further embodiment of any of the above, the stack of rotor disks provides multiple rotating stages. The rotor disk provides a last stage of the stack.

In a further embodiment of any of the above, an exit guide vane is arranged downstream from the rotor disk. An axial gap is provided between the face and the exit guide vane.

In a further embodiment of any of the above, the trailing edge is truncated at least 65% in the axial direction.

In a further embodiment of any of the above, the trailing edge is truncated at least 80% in the axial direction.

In a further embodiment of any of the above, the trailing edge is truncated at least 90% in the axial direction.

In a further embodiment of any of the above, an aft side of the web includes an annular groove configured to receive a hub.

In a further embodiment of any of the above, the blades are integral with the rim and a web that extends radially inward to a bore.

In another exemplary embodiment, a gas turbine engine includes a compressor section and a turbine section. A combustor section is arranged between the compressor and turbine sections. One of the compressor and turbine sections includes a rotor disk. The rotor disk has a rim that supports a blade. The blade includes an end wall and has an airfoil that extends in a chord-wise direction from a leading edge to a trailing edge. A fillet circumscribes the airfoil and joins the airfoil to the end wall. The fillet is at one of the leading edge and the trailing edge truncated at least 50% in an axial direction to provide a face of the rim.

In a further embodiment of any of the above, the rotor disk is arranged in the compressor section and comprises an exit guide vane that is arranged downstream from the rotor disk and upstream from the combustor section. An axial gap is provided between the face and the exit guide vane.

In a further embodiment of any of the above, the trailing edge is truncated at least 65% in the axial direction.

In a further embodiment of any of the above, the trailing edge is truncated at least 80% in the axial direction.

In a further embodiment of any of the above, the trailing edge is truncated at least 90% in the axial direction.

In a further embodiment of any of the above, the blades are integral with the rim and a web that extends radially inward to a bore.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
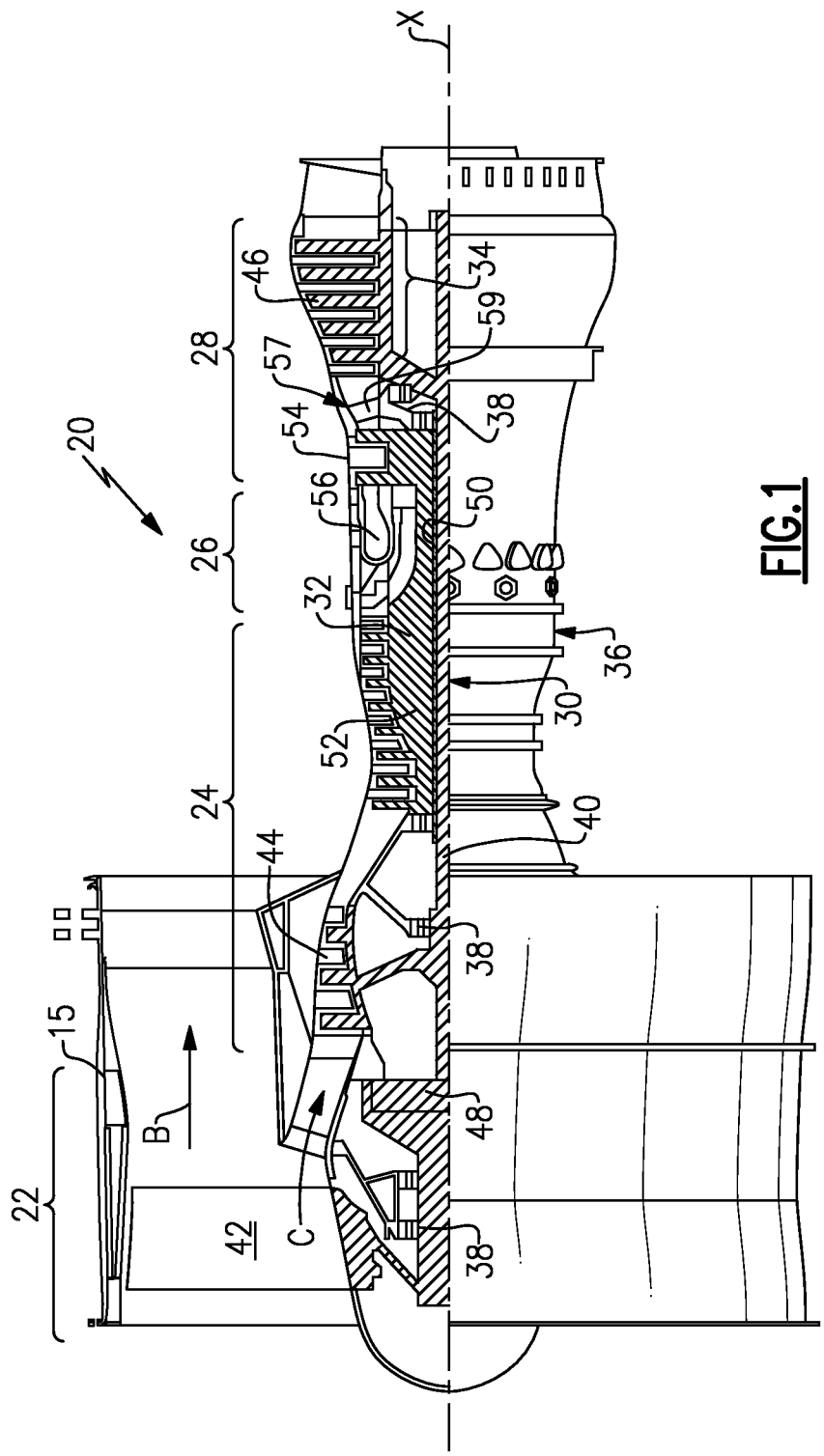
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{R})/(518.7° \text{R})]^{0.5}$. The "Low corrected fan tip speed" as disclosed herein according to one non-limiting embodiment is less than about 1150 ft/second (350.5 meters/second).

Figure 2:
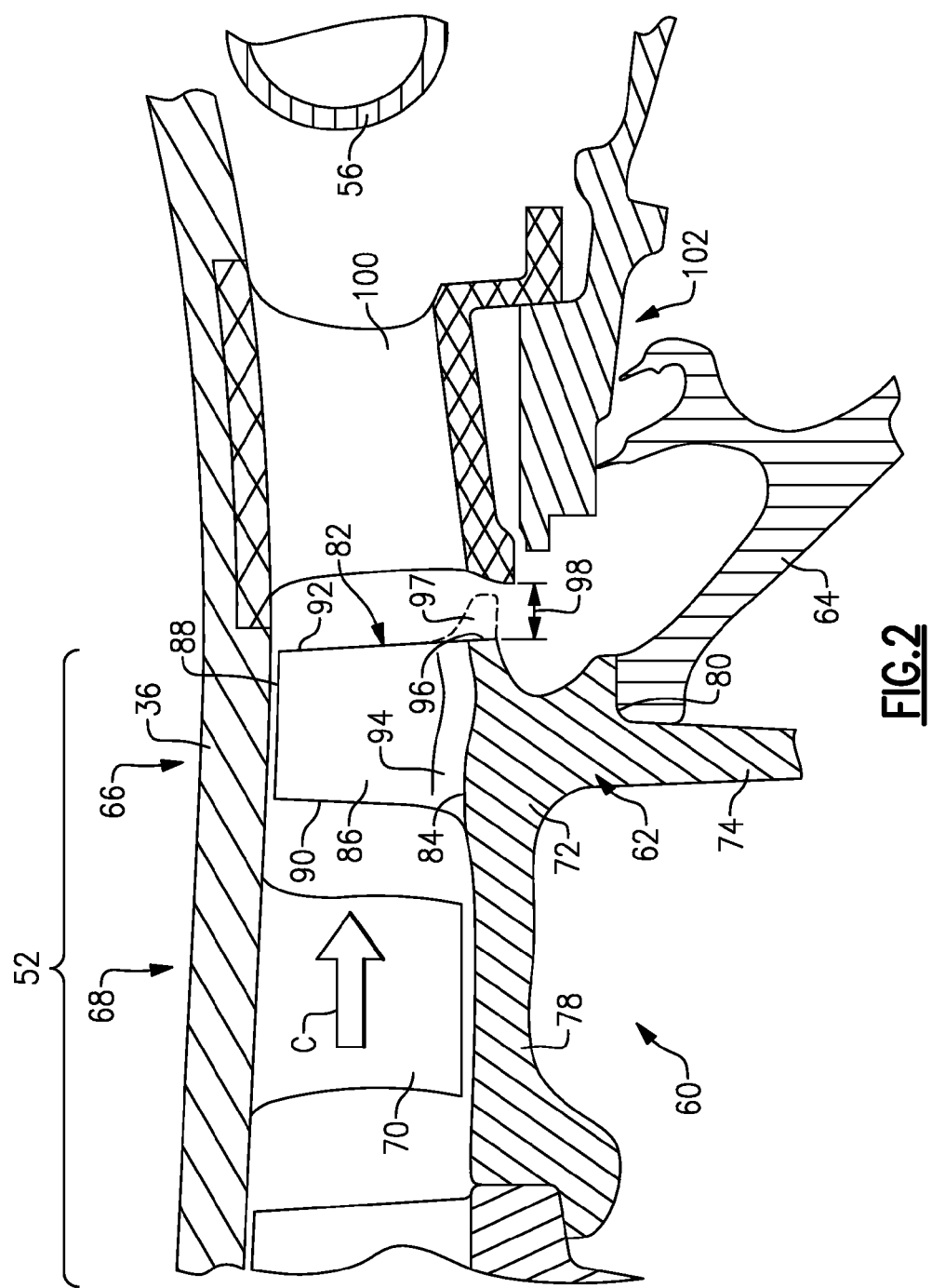
FIG. 2 is a cross-sectional view through a portion of a high pressure compressor of the engine in FIG. 1.

A stack 60 of rotor disks 62 is provided in the high pressure compressor 52 upstream from the combustor section 56, as shown in FIG. 2. The stack 60 includes a hub 64 engaging the aftmost rotor disk 62 to clamp the rotor disks to one another and provide multiple rotating stages 66. The aft side of the rotor disk 62 includes an annular groove 80 that receives the hub 64. Fixed stages 68 including vane 70 are supported by the engine static structure 36 and are arranged between the rotating stages 66.

Figure 3:
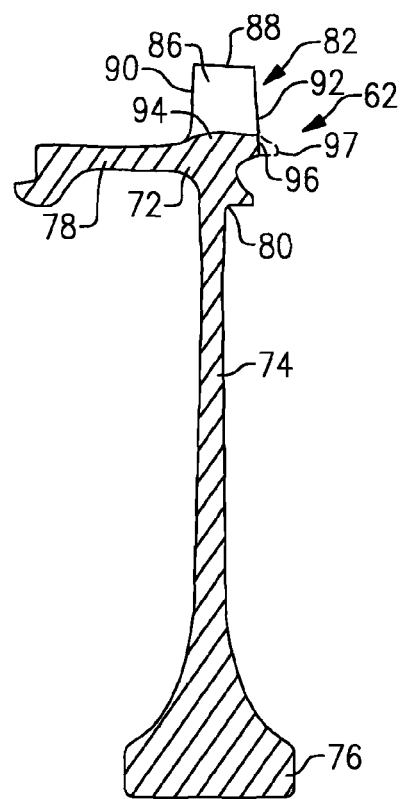
FIG. 3 is an enlarged cross-sectional view through a rotor disk of the high pressure compressor as shown in FIG. 2.
Figure 4:
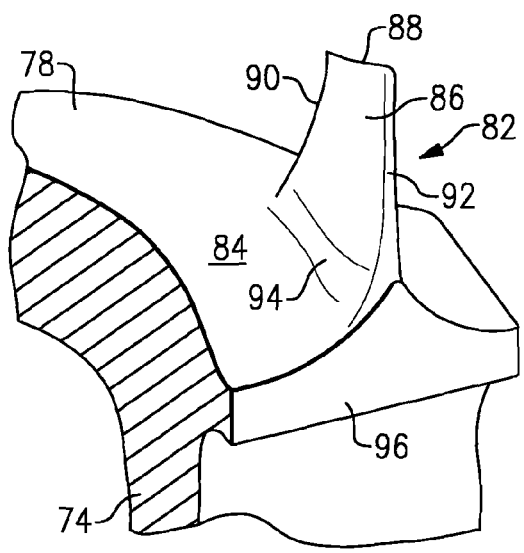
FIG. 4 is an aft view of the rotor disk shown in FIG. 3.

Referring to FIGS. 2 and 3, the rotor disk 62 includes a rim 72 integral with a web 74 that extends inwardly to a bore 76. The rim 72 provides an end wall 84 from which integral blades 82 extend radially outward to a tip 88. The rotor disk 62 is constructed from a machined, one-piece titanium or nickel alloy forging, for example.

The blades 82 provide an airfoil 86 that extends in a chord-wise direction from a leading edge 90 to a trailing edge 92. A fillet 94 circumscribes the airfoil 86 and joins the airfoil 86 to the end wall 84 to provide a structure and aerodynamic transition between the end wall 84 and the airfoil 86.

Typically, the fillet 94 circumscribes the entire airfoil 86. In the disclosed embodiment, the fillet 94 is truncated at the trailing edge 92 at least 50% in an axial direction, corresponding to the engine's axis X, to provide an aft face 96 of the rim 72. The leading edge 90 may also be aggressively truncated if it is near the edge of the rim 72. The truncated portion of the fillet 94 is shown in phantom at 97 in FIGS. 2 and 3. In one embodiment, the trailing edge is truncated at least 65% in the axial direction, and in another embodiment, the trailing edge 92 is truncated at least 80% in the axial direction. In still another embodiment, the trailing edge 92 is truncated at least 90% in the axial direction.

Referring to FIG. 2, an axial gap 98 is provided between the aft face 96 and a forward portion of an exit guide vane 100 arranged between the rotor disk 62 and the combustor section 56. A seal assembly 102 is provided between the hub 64 and structure supporting the exit guide vane 100 at an inboard location to prevent core flow from circumventing the core flow path.

The truncated fillet at the trailing edge 92 better accommodates thermal growth in the stack 60 as well as the exit guide vane 100 and associated structure to provide desired clearance at the axial gap 98. Additionally, removal of the truncated portion 97 reduces the weight at the rim which may reduce stress in the rotor disk and increase its life.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An integrally bladed rotor comprising:
a rim integral with a web that extends radially inward to a bore, the rim providing an end wall from which integral blades extend radially outward to a tip, the blades have an airfoil that extends in a chord-wise direction from a leading edge to a trailing edge, a fillet circumscribes the airfoil and joins the airfoil to the end wall, the fillet at the trailing edge truncated at least 50% in an axial direction to provide a face of the rim.

2. The integrally bladed rotor according to claim 1, wherein the trailing edge is truncated at least 65% in the axial direction.

3. The integrally bladed rotor according to claim 2, wherein the trailing edge is truncated at least 80% in the axial direction.

4. The integrally bladed rotor according to claim 3, wherein the trailing edge is truncated at least 90% in the axial direction.

5. The integrally bladed rotor according to claim 1, where an aft side of the web includes an annular groove configured to receive a hub.

6. A gas turbine engine compressor section comprising:
a stack of rotor disks, one of the rotor disks includes a rim supporting a blade, the blade includes an end wall and has an airfoil that extends in a chord-wise direction from a leading edge to a trailing edge, a fillet circumscribes the airfoil and joins the airfoil to the end wall, the fillet at the trailing edge truncated at least 50% in an axial direction to provide a face of the rim.

7. The compressor section according to claim 6, wherein the stack of rotor disks provides multiple rotating stages, the rotor disk provides a last stage of the stack.

8. The compressor section according to claim 7, comprising an exit guide vane arranged downstream from the rotor disk, an axial gap provided between the face and the exit guide vane.

9. The compressor section according to claim 8, wherein the trailing edge is truncated at least 65% in the axial direction.

10. The compressor section according to claim 9, wherein the trailing edge is truncated at least 80% in the axial direction.

11. The compressor section according to claim 10, wherein the trailing edge is truncated at least 90% in the axial direction.

12. The compressor section according to claim 8, where an aft side of the web includes an annular groove configured to receive a hub.

13. The compressor section according to claim 6, wherein the blades are integral with the rim and a web that extends radially inward to a bore.

14. A gas turbine engine comprising:
a compressor section;
a turbine section;
a combustor section arranged between the compressor and turbine sections; and
wherein one of the compressor and turbine sections includes a rotor disk, the rotor disk has a rim supporting a blade, the blade includes an end wall and has an airfoil that extends in a chord-wise direction from a leading edge to a trailing edge, a fillet circumscribes the airfoil and joins the airfoil to the end wall, the fillet at the trailing edge truncated at least 50% in an axial direction to provide a face of the rim.

15. The engine according to claim 14, wherein the rotor disk is arranged in the compressor section, and comprising an exit guide vane arranged downstream from the rotor disk and upstream from the combustor section, an axial gap provided between the face and the exit guide vane.

16. The engine according to claim 14, wherein the trailing edge is truncated at least 65% in the axial direction.

17. The engine according to claim 16, wherein the trailing edge is truncated at least 80% in the axial direction.

18. The engine according to claim 17, wherein the trailing edge is truncated at least 90% in the axial direction.

19. The engine according to claim 14, wherein the blades are integral with the rim and a web that extends radially inward to a bore.

* * * * *